United States Patent
Matsuno et al.

(10) Patent No.: US 7,878,013 B2
(45) Date of Patent: Feb. 1, 2011

(54) TRAILER REFRIGERATION SYSTEM

(75) Inventors: Sumikazu Matsuno, Shiga (JP); Tetsuo Nakata, Shiga (JP); Yuzo Sawada, Osaka (JP); Fumiaki Yakushiji, Osaka (JP); Yukio Nishihama, Osaka (JP); Keisuke Kudou, Osaka (JP); Yasutoshi Mizutani, Osaka (JP)

(73) Assignee: Dalkin Industries, Ltd., Osaka (JP)

( * ) Notice: Subject to any disclaimer, the term of this patent is extended or adjusted under 35 U.S.C. 154(b) by 367 days.

(21) Appl. No.: 12/083,783

(22) PCT Filed: Oct. 16, 2006

(86) PCT No.: PCT/JP2006/320562
§ 371 (c)(1),
(2), (4) Date: Apr. 18, 2008

(87) PCT Pub. No.: WO2007/046330
PCT Pub. Date: Apr. 26, 2007

(65) Prior Publication Data
US 2009/0133419 A1 May 28, 2009

(30) Foreign Application Priority Data
Oct. 21, 2005 (JP) .......................... 2005-307855

(51) Int. Cl.
*B60H 1/32* (2006.01)
(52) U.S. Cl. .................. 62/228.1; 62/239; 62/323.1
(58) Field of Classification Search ............ 62/228.1, 62/228.4, 239, 244, 323.1
See application file for complete search history.

(56) References Cited

U.S. PATENT DOCUMENTS

| | | | |
|---|---|---|---|
| 5,247,808 A * | 9/1993 | Yoshida et al. | 62/228.4 |
| 6,367,273 B2 * | 4/2002 | Takagi et al. | 62/230 |
| 6,688,125 B2 * | 2/2004 | Okamoto et al. | 62/239 |
| 6,708,507 B1 * | 3/2004 | Sem et al. | 62/126 |

FOREIGN PATENT DOCUMENTS

| | | |
|---|---|---|
| EP | 1 512 565 A1 | 8/2004 |
| JP | 63-254369 A | 10/1988 |
| JP | 5-38933 A | 2/1993 |
| JP | 5-60427 A | 3/1993 |
| JP | 9-21578 A | 1/1997 |
| JP | 2003-224999 A | 8/2003 |

* cited by examiner

*Primary Examiner*—William E Tapolcai
(74) *Attorney, Agent, or Firm*—Birch, Stewart, Kolasch & Brich, LLP.

(57) ABSTRACT

A trailer refrigeration system comprising: an electricity generator (22); an electricity-generator engine (21) for driving the electricity generator (22); a converter (23) for converting ac electric power generated by the electricity generator (22) into dc electric power; an inverter (24, 25, 26) including inverters (24), (25), (26) each for converting dc electric power from the converter (23) into ac electric power; a refrigerant circuit (30) having an electric compressor (31) and a fan (35, 36) including fans (35), (36), the electric compressor (31), the fan (35), and the fan (36) being driven respectively by ac electric power from inverters (24), (25), (26); and a control means (40) for individually controlling the speed of rotation of the electric compressor (31), the fan (35), and the fan (36).

13 Claims, 7 Drawing Sheets

FIG. 7

| LOAD FACTOR (%) | HEAT EXCHANGE AMOUNT (kw) | AIR VOLUME (m³/min) | SUCTION TEMPERATURE (°C) | SUPPLY AIR TEMPERATURE (°C) |
|---|---|---|---|---|
| 100 | 16.5 | 100 | 0 | -7.6 |
| 100 | 16.5 | 80 | 0 | -9.5 |
| 100 | 16.5 | 60 | 0 | -12.7 |
| 100 | 16.5 | 40 | 0 | -19.0 |
| 80 | 13.2 | 100 | 0 | -6.1 |
| 80 | 13.2 | 80 | 0 | -7.6 |
| 80 | 13.2 | 60 | 0 | -10.2 |
| 80 | 13.2 | 40 | 0 | -15.2 |
| 60 | 9.9 | 100 | 0 | -4.6 |
| 60 | 9.9 | 80 | 0 | -5.7 |
| 60 | 9.9 | 60 | 0 | -7.6 |
| 60 | 9.9 | 40 | 0 | -11.4 |
| 40 | 6.6 | 100 | 0 | -3.0 |
| 40 | 6.6 | 80 | 0 | -3.8 |
| 40 | 6.6 | 60 | 0 | -5.1 |
| 40 | 6.6 | 40 | 0 | -7.6 |
| 30 | 4.95 | 100 | 0 | -2.3 |
| 30 | 4.95 | 80 | 0 | -2.9 |
| 30 | 4.95 | 60 | 0 | -3.8 |
| 30 | 4.95 | 40 | 0 | -5.7 |
| 20 | 3.3 | 100 | 0 | -1.5 |
| 20 | 3.3 | 80 | 0 | -1.9 |
| 20 | 3.3 | 60 | 0 | -2.5 |
| 20 | 3.3 | 40 | 0 | -3.8 |
| 10 | 1.65 | 100 | 0 | -0.8 |
| 10 | 1.65 | 80 | 0 | -1.0 |
| 10 | 1.65 | 60 | 0 | -1.3 |
| 10 | 1.65 | 40 | 0 | -1.9 |

FREEZE-STORAGE APPLICATION

COLD-STORAGE APPLICATION

TRAILER REFRIGERATION SYSTEM

TECHNICAL FIELD

In general, the present invention relates to refrigeration systems intended for use in transport trailers. More specifically, the present invention relates to techniques for the reduction in engine size and weight.

BACKGROUND ART

In the past, refrigeration systems intended for installation in refrigeration vehicles for ground transportation of frozen foods et cetera and providing cooling of the inside of their refrigeration storage compartments, have been known in the art. In one such refrigeration system, its compressor is driven by electric power generated by the power of a drive engine of the refrigeration vehicle.

However, the problem with this case is that upon the turning off of the drive engine, the compressor, too, is brought to a stop. As a result, the temperature of the inside of the refrigeration storage compartment increases. There is a refrigeration vehicle made up of a powered vehicle (trailer head) having a driver's cabin, and a cargo-carrying platform vehicle (trailer) carrying thereon a refrigeration storage compartment. The trailer head and the trailer are configured such that they are detachable from each other. In this refrigeration vehicle, the powered vehicle is provided with a drive engine and the cargo-carrying platform vehicle is provided with a refrigeration system. This produces the problem that the compressor is nevertheless brought to a stop when the cargo-carrying platform vehicle is detached from the powered vehicle, for example, for switching to a different powered vehicle.

In order to cope with these problems, there is proposed a refrigeration system (see, for example, Japanese Patent Document JP-A-H05 (1993)-38933). That is, the cargo-carrying platform vehicle (trailer) is equipped with a separate refrigerator engine from the vehicle drive engine so that the compressor is driven by the refrigerator engine. To sum up, the refrigeration system can be continuously kept in operation on the side of the cargo-carrying platform vehicle even when the drive engine is turned off or the cargo-carrying platform vehicle is detached from the powered vehicle.

DISCLOSURE OF THE INVENTION

Problems that the Invention Seeks to Overcome

However, in the refrigeration system of the patent document described above, the compressor is driven, with it being directly connected to the refrigerator engine. The problem with this is that it is required that the speed of rotation of the refrigerator engine be kept low because of the constraint imposed by the allowable speed of rotation of the compressor. That is, the maximum allowable speed of rotation of the compressor is set based on the view point of efficiency and reliability. However, this speed of rotation is extremely lower than the rated speed of rotation of the refrigerator engine. Therefore, it is required that the refrigerator engine be run at below its allowable speed of rotation. Accordingly, the refrigerator engine is required to exert high torque at low speed of rotation. In order to meet this requirement, it is required that the engine displacement be increased more than is necessary. This causes the problem that the engine grows in both size and weight.

In view of the above-described problems associated with the conventional techniques, the present invention was made. Accordingly, an object of the present invention is to accomplish, in a refrigeration system incorporated in a cargo-carrying platform vehicle as a trailer and equipped with a separate refrigerator engine from a vehicle drive engine for driving refrigeration equipment such as a compressor, the reduction in engine size and weight by individually controlling the refrigerator engine, the compressor and other equipment.

Means for Solving the Problems

The present invention provides, as a first aspect, a refrigeration system for use in a trailer, the trailer refrigeration system comprising: an electricity generator (22); an electricity-generator engine (21) for driving the electricity generator (22); a converter (23) for converting ac electric power generated by the electricity generator (22) into dc electric power; an inverter (24, 25, 26) comprising inverters (24), (25), (26) each for converting dc electric power from the converter (23) into ac electric power; a refrigerant circuit (30) having an electric compressor (31) and a fan (35, 36) comprising fans (35), (36), the electric compressor (31), the fan (35), and the fan (36) being driven respectively by ac electric power from the inverters (24), (25), (26); and a control means (40) for individually controlling the speed of rotation of the electricity-generator engine (21), the electric compressor (31), the fan (35), and the fan (36).

It is configured in the first aspect of the present invention such that the converter (23) and each inverter (24, 25, 26) lie between the electricity generator (22) and the electric compressor (31). As a result of such a configuration, the speed of rotation of the electricity-generator engine (21) is out of conjunction with the speed of rotation of the electric compressor (31). The control means (40) controls the electricity-generator engine (21), the electric compressor (31), and each fan (35, 36) so that they are driven, respectively, at different speeds of rotation. Accordingly, for example, even when the electricity-generator engine (21) is run at relatively high speed of rotation that provides optimal engine efficiency, the electric compressor (31) and each fan (35, 36) are driven at lower speed of rotation than the speed of rotation of the electricity-generator engine (21) that provides optimal engine efficiency.

The present invention provides, as a second aspect according to the first aspect, a trailer refrigeration system in which when the electric compressor (31) is driven at the maximum speed of rotation thereof, the control means (40) controls the electricity-generator engine (21) so that the speed of rotation of the electricity-generator engine (21) falls lower than the maximum speed of rotation of the electric compressor (31).

In the second aspect of the present invention, the electric compressor (31) is driven at its maximum speed of rotation when the maximum refrigeration capacity is required. Even in that case, there is no need that the electricity-generator engine (21) be driven at the same speed of rotation as the electric compressor (31), and the electricity-generator engine (21) is driven at lower speed of rotation than its maximum speed of rotation. This therefore eliminates the need that the engine displacement of the electricity-generator engine (21) be made to match the refrigeration capacity exhibitable by the electric compressor (31). It is thus possible to reduce the electricity-generator engine (21) in size.

In addition, the present invention provides, as a third aspect according to either the first or the second aspect, a trailer refrigeration system in which when the electric compressor (31) is driven at the minimum speed of rotation thereof, the control means (40) controls the electricity-generator engine (21) so that the speed of rotation of the electricity-generator engine (21) exceeds the minimum speed of rotation of the electric compressor (31).

In the third aspect of the present invention, the electric compressor (31) is driven at its minimum speed of rotation when the minimum refrigeration capacity is required. Even in that case, there is no need that the electricity-generator engine (21) be driven at the same speed of rotation as the electric compressor (31), and the electricity-generator engine (21) is driven at higher speed of rotation than the minimum speed of rotation. This therefore eliminates the need that the electricity-generator engine (21) should exhibit high torque at low speed of rotation. It is possible to prevent the electricity-generator engine (21) from increasing in size.

In addition, the present invention provides, as a fourth aspect according to any one of the first to the third aspect, a trailer refrigeration system in which the control means (40) includes: a refrigeration equipment control part (41) for controlling, based on the storage compartment temperature of the trailer, the output of each inverter (24, 25, 26) to thereby control the speed of rotation of the electric compressor (31), the fan (35), and the fan (36); and an engine control part (42) for controlling, based on either the input/output state of each inverter (24, 25, 26) or the input/output state of the converter (23), the speed of rotation of the electricity-generator engine (21).

In the fourth aspect of the present invention, the refrigeration equipment control part (41) controls the inverters (24), (25), (26) so that the electric compressor (31), the fan (35), and the fan (36) are driven at respective speeds of rotation that provide optimal efficiency. On the other hand, either based on the input/output state of each inverter (24, 25, 26) or based on the input/output state of the converter (23), the engine control part (42) finds the quantity of electric power required in the electricity-generator engine (21). And, in order that the required quantity of electric power may be generated, the engine control part (42) controls the electricity-generator engine (21) to be driven at a speed of rotation that provides optimal efficiency. Stated another way, the speed of rotation of the electricity-generator engine (21) is controlled independently of the speed of rotation of equipment such as the electric compressor (31).

The present invention provides, as a fifth aspect according to the fourth aspect, a trailer refrigeration system in which the engine control part (42) is configured such that it controls the speed of rotation of the electricity-generator engine (21) by regulating the amount of fuel supply to the electricity-generator engine (21).

In the fifth aspect of the present invention, the speed of rotation of the electricity-generator engine (21) increases if the amount of fuel supply thereto is increased while on the other hand the speed of rotation of the electricity-generator engine (21) decreases if the amount of fuel supply thereto is decreased.

In addition, the present invention provides, as a sixth aspect according to the fifth aspect, a trailer refrigeration system in which the electricity-generator engine (21) has an electronic governor. The engine control part (42) is configured such that it regulates the amount of fuel supply to the electricity-generator engine (21) by controlling the electric governor.

In the sixth aspect of the present invention, since the amount of fuel supply is regulated by electronic governor control, the speed of rotation of the electricity-generator engine (21) is controlled to high accuracy.

In addition, the present invention provides, as a seventh aspect according to any one of the first to the third aspect, a trailer refrigeration system in which the electric compressor (31) is configured such that it has a compression mechanism of the rotary type.

In the seventh aspect of the present invention, the compression mechanism of the electric compressor (31) is of the scroll type or of the rotary type. For the case of such a rotary compression mechanism, its starting torque is smaller than that of the reciprocating compression mechanism. Accordingly, the electric power necessary for staring the electric compressor (31) is reduced, thereby reducing the power necessary for the electricity-generator engine (21).

In addition, the present invention provides, as an eighth aspect according to any one of the first to the third aspect, a trailer refrigeration system in which the trailer refrigeration system is provided with a selector switch (27) for providing selective switching between a first state that establishes connection of the converter (23) to the electricity generator (22) and a second state that establishes connection of the converter (23) to a commercial power-supply source.

In the eighth aspect of the present invention, for example, when the refrigeration vehicle remains parked for many hours, the converter (23) can be connected to a commercial power supply source provided on the ground after the electricity-generator engine (21) is turned off. This therefore allows the electricity-generator engine (21) to run in an energy-saving mode of operation.

In addition, the present invention provides, as a ninth aspect according to the fourth aspect, a trailer refrigeration system in which the control means (40) is provided with a compressor malfunction detection part (44) for detecting whether or not a malfunction is occurring in the electric compressor (31). If the compressor malfunction detection part (44) detects such a compressor malfunction, the refrigeration equipment control part (41) controls the inverter (24) so that the speed of rotation of the electric compressor (31) is fixed at a predetermined value.

In the ninth aspect of the present invention, the compressor malfunction detection part (44) detects whether or not a malfunction is occurring in the electric compressor (31), in other words, it detects whether or not the electric compressor (31) is about to malfunction. Upon the detection of such a malfunction, the speed of rotation of the electric compressor (31) is fixed at a predetermined value. Accordingly, the speed of rotation of the electric compressor (31) remains unchanged, thereby reducing the load due to the change in the speed of rotation. This therefore enables the electric compressor (31) to operate for as long as possible until the time of replacement.

In addition, the present invention provides, as a tenth aspect according to the ninth aspect, a trailer refrigeration system in which the compressor malfunction detection part (44) is configured such that it detects, based on the generated torque, T, of a motor of the electric compressor (31), whether or not a malfunction is occurring in the electric compressor (31).

In the tenth aspect of the present invention, it is possible, if the motor generated torque at the time of normal operation is pre-stored as data, to easily detect whether or not a malfunction is occurring by comparison between the pre-stored torque data and the actual generated torque, T.

In addition, the present invention provides, as an eleventh aspect according to the ninth aspect, a trailer refrigeration system in which the compressor malfunction detection part (44) is configured such that it detects, based on the winding resistance, R, of a motor of the electric compressor (31), whether or not a malfunction is occurring in the electric compressor (31).

In the eleventh aspect of the present invention, it is possible, if the winding resistance at the time of normal operation is pre-stored as data, to easily detect whether or not a malfunction is occurring by comparison between the pre-stored winding resistance data and the actual winding resistance, R.

In addition, the present invention provides, as a twelfth aspect according to the ninth aspect, a trailer refrigeration system in which the compressor malfunction detection part (44) is configured such that it detects, based on the magnetic flux, $\Psi$, of a motor magnet of the electric compressor (31), whether or not a malfunction is occurring in the electric compressor (31).

In the twelfth aspect of the present invention, it is possible, if the magnetic flux at the time of normal operation is pre-stored as data, to easily detect whether or not a malfunction is occurring by comparison between the pre-stored magnetic flux data and the actual magnetic flux, $\Psi$.

In addition, the present invention provides, as a thirteenth aspect according to the fourth aspect, a trailer refrigeration system in which the control means (40) is provided with an engine malfunction detection part (45) for detecting, based on the amount of fuel supply to the electricity-generator engine (21), whether or not a malfunction is occurring in the electricity-generator engine (21). The refrigeration equipment control part (41) is configured such that if the engine malfunction detection part (45) detects such an engine malfunction, it controls the speed of rotation of the electric compressor (31) and at least either one of the fans (35), (36) so that the load of the electricity-generator engine (21) is reduced.

In the thirteenth aspect of the present invention, the engine malfunction detection part (45) detects whether or not a malfunction is occurring in the electricity-generator engine (21), in other words, it detects whether or not the electricity-generator engine (21) is about to malfunction. Once such a malfunction is detected, the electric compressor (31) et cetera are driven regardless of the optimality of the operation efficiency of the electric compressor (31) and each fan (35, 36) whereby the temperature of the storage compartment is controlled. In other words, the electric compressor (31) et cetera are driven such that the input/output electric current of the electric compressor (31) et cetera decreases. This enables the electricity-generator engine (21) to operate for as long as possible until the time of replacement.

In addition, the present invention provides, as a fourteenth aspect according to the fourth aspect, a trailer refrigeration system in which the control means (40) is provided with a fan malfunction detection part (46) for detecting whether or not a malfunction is occurring in the fan (35, 36). The refrigeration equipment control part (41) is configured such that if the fan malfunction detection part (46) detects such a fan malfunction, it controls the inverter (25, 26) so that the speed of rotation of the fan (35, 36) is fixed at a predetermined value.

In the fourteenth aspect of the present invention, the fan malfunction detection part (46) detects whether or not a malfunction is occurring in the fan (35, 36), in other words, it detects whether or not the fan (35, 36) is about to malfunction. Once such a malfunction is detected, the speed of rotation of the fan (35, 36) is fixed at a predetermined value. Therefore, since the speed of rotation of the fan (35, 36) remains unchanged, the load due to the change in the speed of rotation is reduced. This enables the fan (35, 36) to operate for as long as possible until the time of replacement.

Advantageous Effects of the Invention

As described above, in accordance with the present invention, the electricity-generator engine (21), the electric compressor (31), and the fans (35), (36) can be controlled separately independently of one another, and it is no longer required that the electricity-generator engine (21) be driven in conjunction with the speed of rotation of the electric compressor (31) and the fans (35), (36). Accordingly, there is no need that the electricity-generator engine (21) be driven, for example, at low speed of rotation/high torque, thereby eliminating the need to increase the displacement of the electricity-generator engine (21) more than is necessary. As a result, it becomes possible to reduce the electricity-generator engine (21) in both size and weight.

Besides, it is possible to drive the electricity-generator engine (21) at a speed of rotation that provides optimal efficiency for the electricity-generator engine (21), regardless of the electric compressor (31) et cetera. As a result, it becomes possible to achieve the energy saving of the system.

In addition, in accordance with the seventh aspect of the present invention, it is possible to reduce the starting torque of the electricity-generator engine (21). Therefore, it becomes possible to reduce the quantity of electric power that the electricity generator (22) is required to generate, thereby making it possible to reduce the power required by the electricity-generator engine (21). As a result, it becomes possible to reduce the size and weight of the electricity-generator engine (21) to a further extent.

In addition, in accordance with the eighth aspect of the present invention, it is arranged such that the converter (23) can be, switchably from the electricity generator (22), connected to a commercial power supply source. As a result, for example, in the case where the refrigeration vehicle is stopped and remains parked for many hours, there is no need to drive the electricity-generator engine (21). As a result, it becomes possible to achieve the energy saving of the electricity-generator engine (21).

In addition, in accordance with the ninth to the fourteenth aspect of the present invention, it is possible to detect whether or not a malfunction is occurring in the electricity-generator engine (21) and the fan (35, 36)), e.g., whether or not they are about to malfunction. It is arranged such that upon the detection of such a malfunction, the load of the electric compressor (31) et cetera is reduced. This enables the electricity-generator engine (21) and the fan (35, 36) to operate for as long as possible until the time of replacement.

BRIEF DESCRIPTION OF THE DRAWINGS

In the accompanying drawings:

FIG. 7 is a table representing a relationship between the air volume and the supply air temperature of the evaporator fan;

INDEX OF REFERENCE SIGNS

Figure 1:
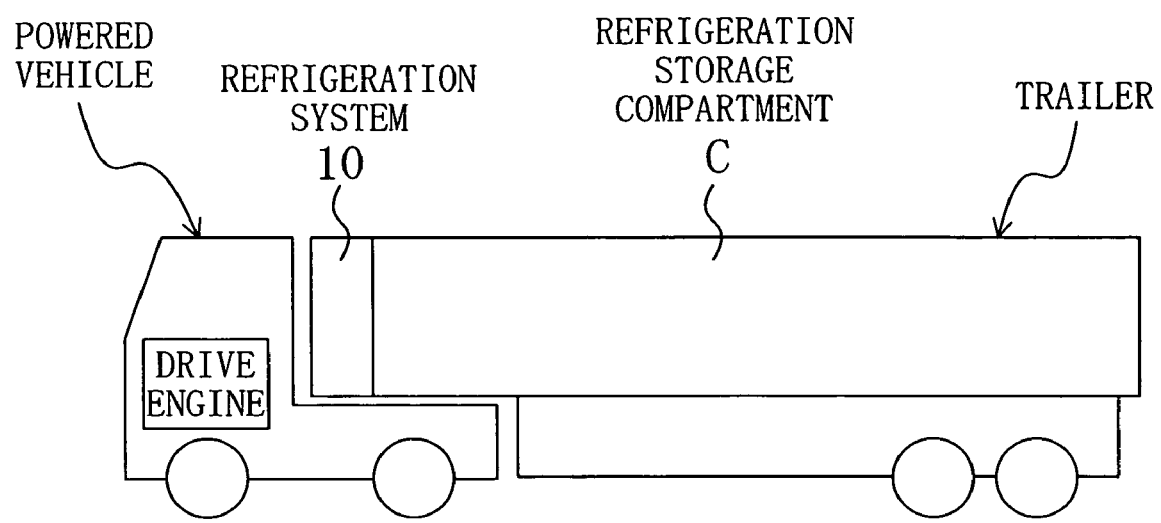
FIG. 1 is a view of the left-hand side of a refrigeration vehicle equipped with a refrigeration system according to an embodiment of the present invention.

10: refrigeration system
21: electricity-generator engine
22: electricity generator
23: converter
24-26: first to third inverters
27: selector switch
30: refrigerant circuit
31: electric compressor
35, 36: condenser fan; evaporator fan
40: control part (control means)
41: refrigeration equipment control part
42: engine control part
44: compressor malfunction detection part
45: engine malfunction detection part
47: fan malfunction detection part

BEST MODE FOR CARRYING OUT THE INVENTION

In the following, an exemplary embodiment of the present invention will be described in detail with reference to the accompanying drawings.

As shown in FIG. 1, a refrigeration system (10) of the present embodiment is incorporated in a refrigeration vehicle for ground transportation of frozen foods, fresh foods and other foods. This refrigeration vehicle includes a powered vehicle (trailer head) having a driver's cabin and a drive engine, and a cargo-carrying platform vehicle (trailer) having a refrigeration storage compartment (C). The trailer head and the trailer are detachably connected together. The refrigeration system (10) of the present embodiment is mounted on the front side of the cargo-carrying platform vehicle (trailer), and provides cooling of the inside of the refrigeration storage compartment (C).

Figure 2:
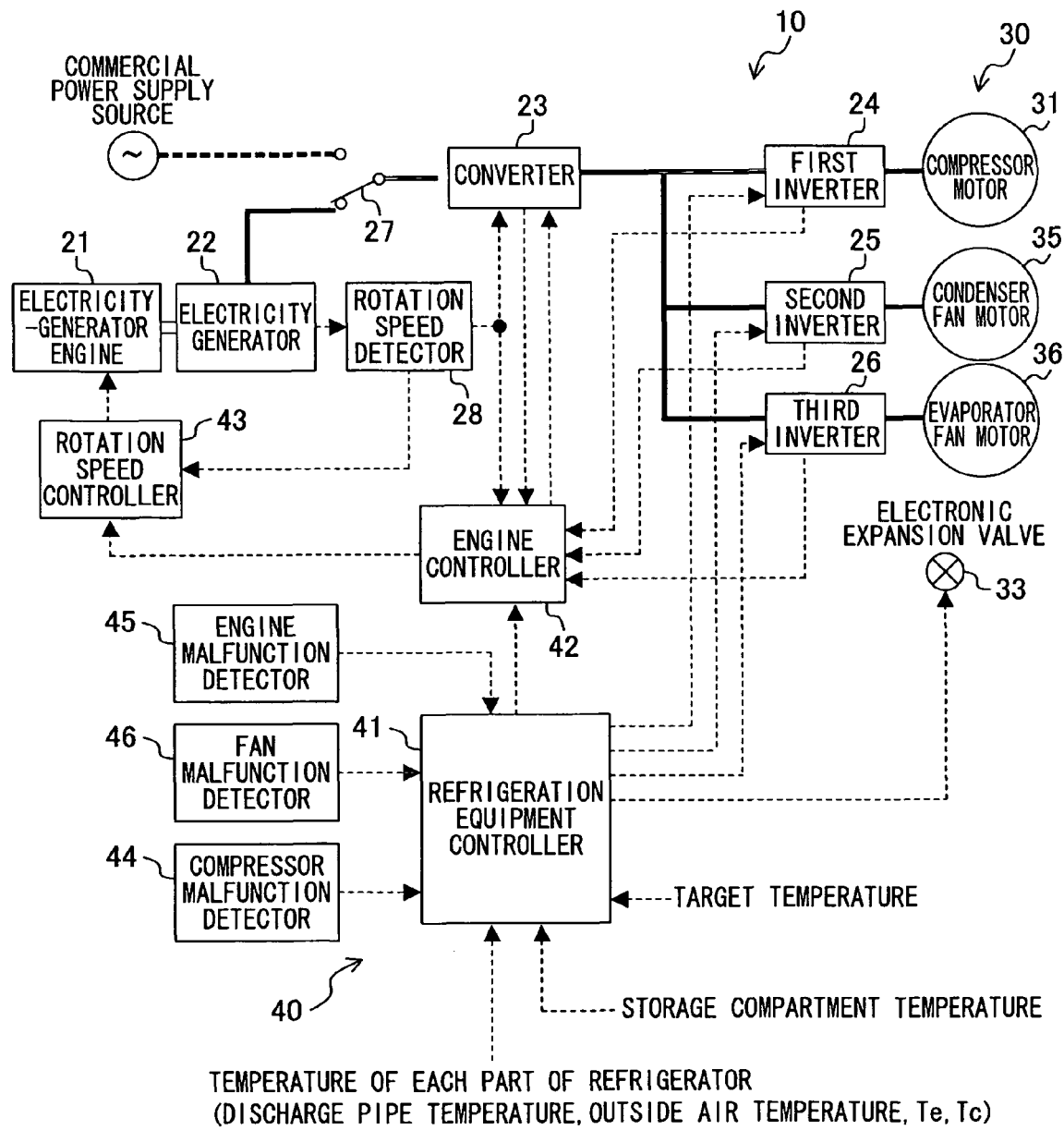
FIG. 2 is a schematic system diagram showing the entire refrigeration system of the embodiment.
Figure 3:
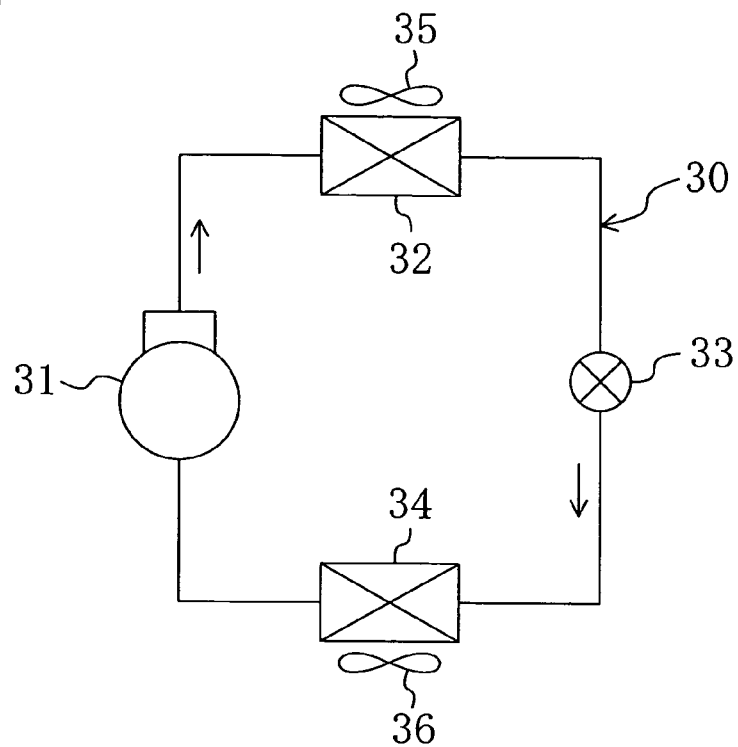
FIG. 3 is a plumbing diagram illustrating a refrigerant circuit of the refrigeration system.

Referring to FIGS. 2 and 3, the refrigeration system (10) includes an electricity-generator engine (21), an electricity generator (22), a converter (23), three inverters (24), (25), (26), and a refrigerant circuit (30).

The electricity generator (22) is connected to the electricity-generator engine (21). The electricity generator (22) uses the power from the electricity-generator engine (21) to generate electricity. The electricity-generator engine (21) is provided separately from the drive engine of the powered vehicle and is for dedicated use by the refrigeration system (10). And, the amount of fuel supply to the electricity-generator engine (21) is regulated by electronic governor control, thereby controlling the speed of rotation of the operation of the electricity-generator engine (21).

The converter (23) is electrically connected to the electricity generator (22). The converter (23) is operative to convert ac electric power generated by the electricity generator (22) into dc electric power. The three inverters (24), (25), (26) are electrically connected in parallel to the converter (23), and convert dc electric power from the converter (23) into ac electric power.

More specifically, the first inverter (24) is configured such that it outputs ac electric power to the motor of an electric compressor (31) (described later) in the refrigerant circuit (30) whereby the electric compressor (31) is driven. The second inverter (25) is configured such that it outputs ac electric power to the motor of a condenser fan (35) (described later) in the refrigerant circuit (30) whereby the condenser fan (35) is driven. The third inverter (26) is configured such that it outputs ac electric power to the motor of an evaporator fan (36) (described later) in the refrigerant circuit (30) whereby the evaporator fan (36) is driven.

To sum up, in the present embodiment, the converter (23) and the inverters (24, 25, 26) together constitute an electric power conversion system.

In the refrigerant circuit (30), the electric compressor (31), a condenser (32), an electronic expansion valve (33), and an evaporator (34) are connected in series by piping. The condenser fan (35) is arranged in the vicinity of the condenser (32) and the evaporator fan (36) in the vicinity of the evaporator (34).

The electric compressor (31) is a compressor of the scroll type. Air outside the storage compartment is taken into the condenser (32) by the condenser fan (35) while air inside the storage compartment is taken into the evaporator (34) by the evaporator fan (36). The refrigerant circuit (30) is configured such that refrigerant is circulated to operate a vapor compression refrigeration cycle. In other words, liquid refrigerant condensed in the condenser (32) is decompressed in the electronic expansion valve (33) and evaporates as a result of heat exchange with air in the storage compartment whereby the air in the storage compartment is cooled.

The refrigeration system (10) is equipped with a rotation speed detection part (28) for detecting the speed of rotation of the operation of the electricity-generator engine (21).

A selector switch (27) lies between the electricity generator (22) and the converter (23). The selector switch (27) is configured such that it provides selective switching between a first state that allows connection of the converter (23) to the electricity generator (22) and a second state that allows connection of the converter (23) to a commercial power supply source. For example, in the case where the refrigeration vehicle remains parked for many hours, the electricity-generator engine (21) is stopped and the selector switch (27) is switched to the second state so that the converter (23) can be connected to a commercial power supply source.

The refrigeration system (10) has a controller (40) (control means). The controller (40) has a refrigeration equipment control part (41), an engine control part (42), a rotation speed control part (43), a compressor malfunction detection part (44), an engine malfunction detection part (45), and a fan malfunction detection part (46).

The refrigeration equipment control part (41) is configured such that it receives the temperature of the inside of the refrigeration storage compartment (C) (storage compartment temperature) and then sets, based on the storage compartment temperature received and the target temperature, a refrigeration capacity required. And, the refrigeration equipment control part (41) is configured such that it controls, based on the required refrigeration capacity, the output electric power of each inverter (24, 25, 26) and the degree of opening of the electronic expansion valve (33). That is, the refrigeration equipment control part (41) individually controls the capacity of the electric compressor (31) and each fan (35, 36) so that they are driven at their optimal efficiency.

In addition, based additionally on the temperature of outside air, the discharge pipe temperature of the electric compressor (31), the refrigerant condensation temperature (Tc), and the refrigerant evaporation temperature (Te), the refrigeration equipment control part (41) controls each inverter (24, 25, 26) and the electronic expansion valve (33).

The refrigeration equipment control part (41) has three different operation control modes, namely, a normal control mode, a high-accuracy control mode, and a fan intermittent control mode.

In the normal control mode, the inverters (24), (25), (26) are controlled such that the electric compressor (31), the fan (35), and the fan (36) are driven at their optimal efficiency.

In the high-accuracy control mode, the speed of rotation of the electric compressor (31) is fixed and only the speed of rotation of each fan (35, 36) is controlled. In other words, the output electric power of the first inverter (24) remains unchanged and only the output electric power of each of the second and third inverters (25), (26) is controlled.

In the fan intermittent control mode, the output electric power of the second and third inverters (25), (26) is controlled so that the fans (35), (36) are driven alternately at low speed of rotation and at high speed of rotation, regardless of the required refrigeration capacity.

The engine control part (42) receives the output electric power state of each inverter (24, 25, 26). The engine control part (42) is configured such that it derives, based on the output electric power received, the speed of rotation of the electricity-generator engine (21) that minimizes both the rate of fuel consumption of the electricity-generator engine (21) and the efficiency of operation of the electricity generator (22).

In addition, the engine control part (42) has two different operation control modes, namely, a normal control mode and a low-noise control mode.

The normal control mode is a mode in which the electricity-generator engine (21) is driven at the allowable maximum speed of rotation as an upper limit. On the other hand, the low-noise control mode is a mode in which the electricity-generator engine (21) is driven at a predetermined speed of rotation as an upper limit lower than the allowable maximum speed of rotation. The level of noise of the electricity-generator engine (21) is high when driven at high speed of rotation. As the upper limit of the speed of rotation is lowered, the electricity-generator engine (21) is driven at lower speed of rotation, thereby reducing the level of noise.

The rotation speed control part (43) receives the speed of rotation of the electricity-generator engine (21) that is derived by the engine control part (42). And, the rotation speed control part (43) is configured such that it regulates the amount of fuel supply to the electricity-generator engine (21) by electronic governor control in order that the electricity-generator engine (21) may be driven at the received speed of rotation.

As described above, in the present refrigeration system (10), the converter (23) and each inverter (24, 25, 26) which are electric power converters are connected between the electricity generator (22) and each of the refrigeration devices. This makes it possible to provide individual control of the speed of rotation of the electricity-generator engine (21), the electric compressor (31) et cetera. As a result, the electricity-generator engine (21) and the electric compressor (31) can be driven at their optimal efficiency.

In addition, the engine control part (42) is configured such that, when the refrigeration equipment control part (41) provides control so that the electric compressor (31) is driven at the maximum speed of rotation thereof, it controls the electricity-generator engine (21) so that the speed of rotation of the electricity-generator engine (21) falls lower than the maximum speed of rotation of the electric compressor (31). In addition, the engine control part (42) is configured such that, when the refrigeration equipment control part (41) provides control so that the electric compressor (31) is driven at the minimum speed of rotation thereof, it controls the electricity-generator engine (21) so that the speed of rotation of the electricity-generator engine (21) exceeds the minimum speed of rotation of the electric compressor (31).

The compressor malfunction detection part (44) is configured such that it detects, based on the output electric power of the first inverter (24) (i.e., the output electric current and the output voltage of the first inverter (24)), whether or not a malfunction is occurring in the electric compressor (31). More specifically, the compressor malfunction detection part (44) makes, from the electric current and the voltage, an estimate of the generated torque (T) of the electric compressor (31) and then determines, based on the estimated generated torque (T), whether the electric compressor (31) is malfunctioning or is about to malfunction.

If the compressor malfunction detection part (44) decides that the electric compressor (31) is malfunctioning, the refrigeration equipment control part (44) stops the operation of the electric compressor (31). In addition, the electricity-generator engine (21) is stopped in some cases. In addition, if the compressor malfunction detection part (44) decides that the electric compressor (31) is about to malfunction, the refrigeration equipment control part (41) controls the first inverter (24) so that the electric compressor (31) is not stopped but its speed of rotation is fixed at a predetermined value, which is hereinafter referred to as the "compressor operable-life extension operation"). In addition to the carrying out of such a compressor operable-life extension operation, the refrigeration equipment control part (41) provides control so that a maintenance request message is displayed on the operation indicator panel or the like.

In addition, the compressor malfunction detection part (44) may be configured such that it makes, from the output electric current and the output voltage of the first inverter (24), an estimate of the winding resistance (R) of the motor of the electric compressor (31) and decides, based on the estimated winding resistance (R), whether the electric compressor (31) is malfunctioning or is about to malfunction. Since the motor winding resistance (R) is proportional to the motor temperature, the state of superheat of the electric compressor (31) is estimated.

Besides, the compressor malfunction detection part (44) may be configured such that it makes, from the output electric current and the output voltage of the first inverter (24), an estimate of the magnetic flux ($\Psi$) of the motor magnet of the electric compressor (31), and then decides, based on the estimated magnetic flux ($\Psi$), whether the electric compressor (31) is malfunctioning or is about to malfunction.

The engine malfunction detection part (45) is configured such that it detects, based on the amount of fuel supply to the electricity-generator engine (21), whether a malfunction is occurring in the electricity-generator engine (21). That is, the engine malfunction detection part (45) decides, based on the relationship between the actual amount of fuel supply and the amount of fuel supply at the time of normal operation, whether the electricity-generator engine (21) is malfunctioning or is about to malfunction.

If the engine malfunction detection part (45) decides that the electricity-generator engine (21) is malfunctioning, the refrigeration equipment control part (41) stops the operation of the electric compressor (31) and each fan (35, 36) while the engine control part (42) stops the operation of the electricity-generator engine (21). In addition, if the engine malfunction detection part (45) decides that the electricity-generator engine (21) is about to malfunction, the refrigeration equipment control part (41) controls the speed of rotation of the electric compressor (31) and at least either one of the fans (35), (36) in order that the load of the electricity-generator engine (21) is reduced without stopping the operation of the electricity-generator engine (21), which is hereinafter referred to as the "engine operable-life extension operation"). In addition to the carrying out of such an engine operable-life extension operation, the refrigeration equipment control part (41) provides control so that a maintenance request message is displayed on the operation indicator panel or the like.

The fan malfunction detection part (46) is configured such that it detects, based on the output electric power of the second inverter (25), whether or not the condenser fan (35) is malfunctioning, and that it detects, on the output electric power of the third inverter (26), whether or not the evaporator fan (36) is malfunctioning. In other words, the fan malfunction detection part (46) detects, based on the output electric current and the output voltage, whether or not the fan (35, 36) is malfunctioning.

If the fan malfunction detection part (46) decides that the fan (35, 36) is malfunctioning, the refrigeration equipment control part (41) stops the operation of the fan (35, 36). The electricity-generator engine (21) is stopped in some cases. If the fan malfunction detection part (46) decides that the fan (35, 36) is about to malfunction, the refrigeration equipment control part (41) controls the inverter (25, 26) in order that the speed of rotation thereof may be fixed at a predetermined value without stopping the operation of the fan (35, 36), which is hereinafter referred to as the "fan operable-life extension operation"). In addition to the carrying out of such a fan operable-life extension operation, the refrigeration equipment control part (41) provides control so that a maintenance request message is displayed on the operation indicator panel or the like.

Running Operation

In the following, the running operation of the refrigeration system (10) of the present embodiment will be described.

In the first place, upon the driving of the electricity-generator engine (21), the electricity generator (22) generates ac electric power by the use of power produced by the electricity-generator engine (21). This ac electric power is converted by the converter (23) into dc electric power. This dc electric power is fed to the inverters (24), (25), (26). Each inverter (24, 25, 26) reconverts the dc electric power into ac electric power for forwarding to the electric compressor (31), the fan (35), and the fan (36), respectively. Consequently, the electric compressor (31) and the fans (35), (36) are driven and the refrigerant circuit (30) operates a vapor compression refrigeration cycle.

In the above-described operation state, each inverter (24, 25, 26) is controlled individually from the other inverters by the refrigeration equipment control part (41) whereby the electric compressor (31) and the fans (35), (36) are controlled. On the other hand, the engine control part (42) controls the speed of rotation of the electricity-generator engine (21) independently of the speed of rotation of the electric compressor (31) and the fans (35), (36).

More specifically, each of the inverters (24), (25), (26) is controlled so that the electric compressor (31) and the fans (35), (36) are driven at their respective speeds of rotation corresponding to the required capacity of refrigeration derived by the refrigeration equipment control part (41). In addition, the speed of rotation of each of the fans (35), (36) is controlled to decrease down to the lowest possible value if they are identical in load factor with each other. FIG. 7 shows that if the fans (35), (36) are identical in load factor with each other, the amount of heat exchange in the evaporator (34), i.e., the capacity of providing refrigeration to the storage compartment, will not vary even when the speed of rotation of the fans (35), (36) is lowered to decease the volume of air. That is, the lowering of the speed of rotation reduces the required amount of electric current and results in the saving of energy. At that time, although the supply air temperature falls, the storage compartment temperature is influenced little.

Figure 4:
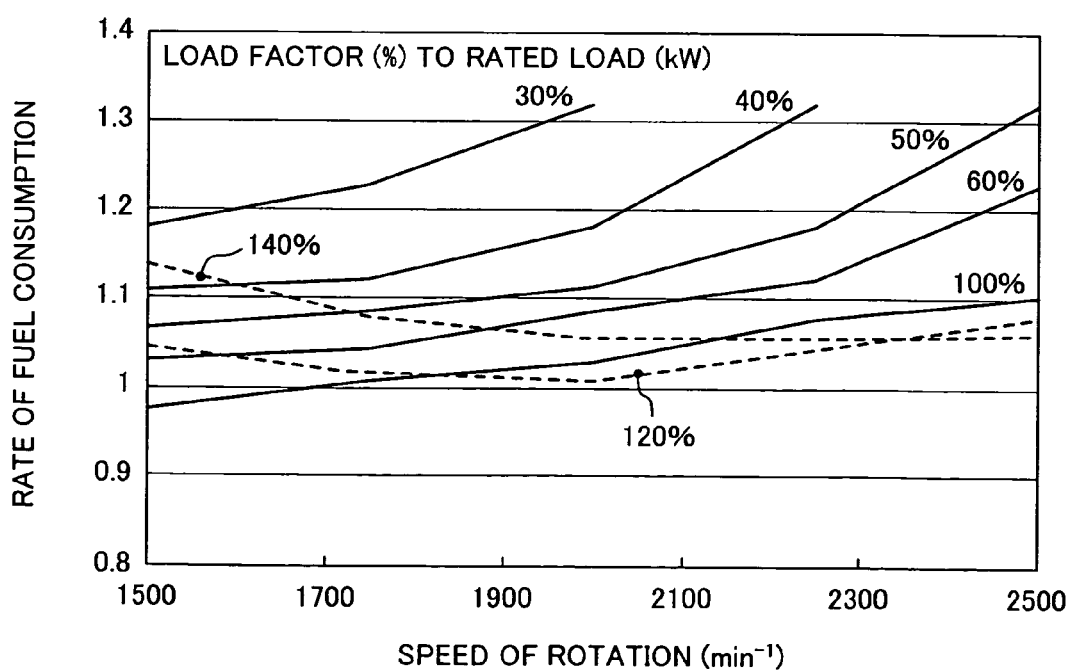
FIG. 4 is a diagram graphically representing the fuel consumption characteristics of the electricity-generator engine by load.

The engine control part (42) calculates the load factor of each of the inverters (24), (25), (26) from their respective output electric power states and derives, based on FIG. 4, the speed of engine rotation that provides the lowest rate of fuel consumption in the calculated load state.

For example, in the condition where the target value of the storage compartment temperature is considerably lowered when refrigeration is controlled in the rated output state (1700 rpm; 10 kW), the procedure is taken as follows. Since the storage compartment temperature differs much from the target temperature value, the refrigeration equipment control part (41) issues to each inverter a command requesting that the capacity of refrigeration be maximized. This consequently increases the amount of electric power consumption, and in order to supply the corresponding amount of electric power thereto, the converter (23) fetches electric power from the electricity generator (22). As a result, the load torque of the electricity-generator engine (21) increases and, since the speed of engine rotation will keep decreasing if the amount of fuel injection remains as it is, the engine rotation speed control part (43) controls the amount of fuel injection to increase in order to maintain the speed of engine rotation as commanded.

For example, for the case where the load is 14 kW (load factor: 140%), FIG. 4 indicates that the rate of fuel consumption at an intersection point of the speed of engine rotation of 1700 rpm and the 140% load factor line is about 1.08. Here, if focused on the 140% load factor line, it proves that the lowest rate of fuel consumption thereof is about 1.05 at above about 2100 rpm. Accordingly, as an engine rotation speed command to the rotation speed control part (43), a command indicative of 2100 rpm is issued thereto. As a result, it is possible to expect an improvement of fuel efficiency of 0.03. For the case of the 140% load factor, the rate of fuel consumption varies little if the speed of engine rotation exceeds 2100 rpm. However, when the speed of engine rotation is increased, there is concern that the level of engine sound increases. It is therefore advisable to select a lower speed of engine rotation if the rate of fuel consumption is the same.

In addition, when the storage compartment is sufficiently cooled down such that there exists only a thermal load from the outside by way of a wall surface or the like, the amount of electric power required by the electric compressor (31) and the fans (35), (36) decreases. In this case, it shows that, like the above, the rate of fuel consumption when the load factor is low is improved as the speed of engine rotation becomes decreased. Therefore, the rate of fuel consumption can be cut down by setting the speed of engine rotation in the lower range. However, since there is a lower limit for the speed of engine rotation, the engine is operated within that range. Consequently, the electricity-generator engine (21), too, can be driven in the most energy saving manner.

Figure 5:
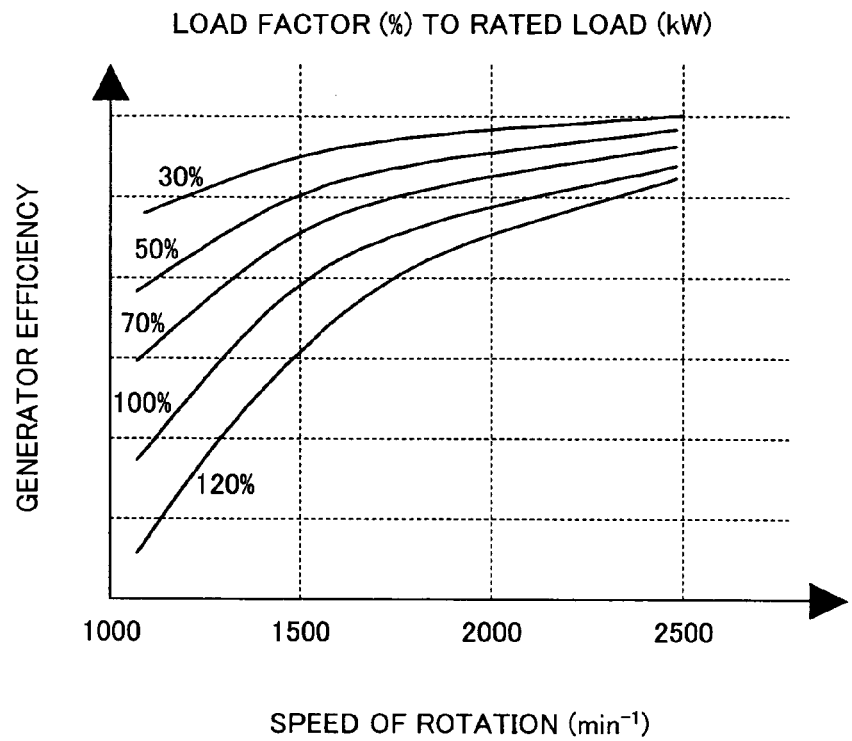
FIG. 5 is a diagram graphically representing the efficiency characteristics of the electricity generator.

In addition, the engine control part (42) calculates the load factor of each of the inverters (24), (25), (26) from their respective output electric power states and then derives, based on FIG. 5, the speed of rotation at which the efficiency of the electricity generator (22) is maximized in the calculated load state. FIG. 5 shows the electricity generator efficiency with respect to the speed of rotation and the load factor of the electricity generator (22). This shows that the efficiency of the electricity generator (22) becomes improved as the speed of rotation thereof becomes higher.

When concerning only the engine, the lowering of the speed of engine rotation as much as possible provides improved efficiency, when the engine load factor is low. However, as described above, the efficiency characteristics of the electricity generator tend to become worse as the speed of rotation decreases. Since the electricity generator and the engine are either in direct connection with each other or connected together through a belt or a gear, they are in proportional relation in the speed of rotation. From this, when taking into account both the rate of fuel consumption which is improved as the value thereof decreases and the efficiency of the electricity generator which is improved as the value thereof increases, it is obvious that the point (at which the output efficiency from the engine to the electricity generator at a certain load factor becomes optimal) can be obtained by finding the speed of rotation at which the total efficiency coefficient (which is found by dividing the efficiency of the electricity generator by the rate of fuel consumption) is maximized. If a command indicative of the speed of rotation at which the total efficiency factor is maximized is issued to the rotation speed control part (43), this allows the electricity generation system to operate at the best rate of fuel consumption.

Figure 6:
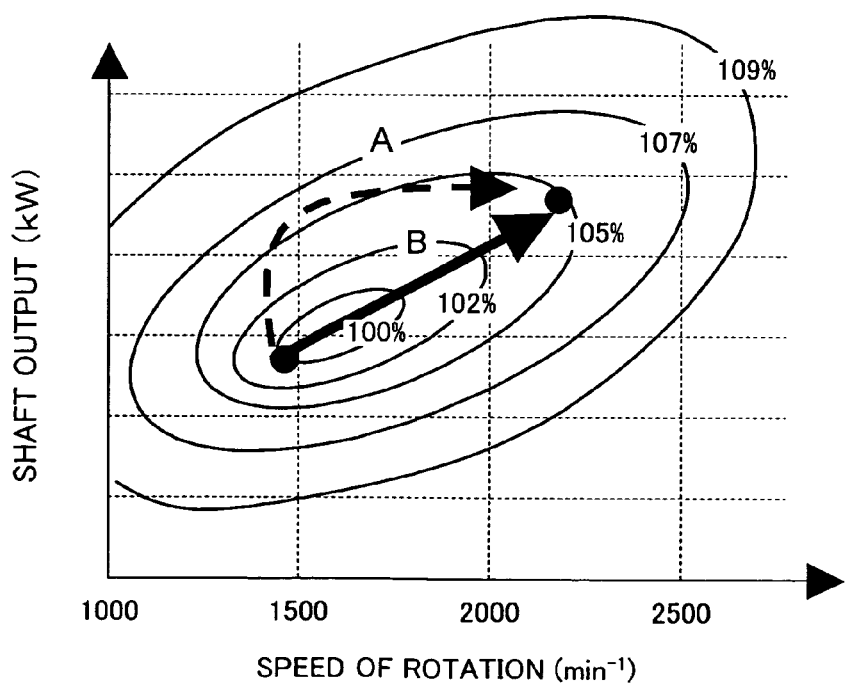
FIG. 6 is a diagram graphically representing a curve of the fuel efficiency of the electricity-generator engine.

In addition, it is possible for the engine control part (42) to provide control as follows. After the determination of the load factor, the speed of rotation that provides the most energy saving at the determined load factor is derived, and the derived speed of rotation is issued as a command. However, in that case, in the operation of the electricity-generator engine (21) when the load varies in the direction in which it increases, the load increases with the rotation speed command fixed, and since the rotation speed command is fixed, the rate of fuel consumption increases with a view to increasing the output while the speed of rotation is maintained. Thereafter, since there is a transition to the foregoing speed of rotation that provides the most energy saving, it follows a path like Path A shown in FIG. 6.

However, the fact that the refrigeration equipment control part (41) proceeds with the operation of increasing the capacity of refrigeration (which results in increasing the engine load factor) can be obtained as information and, in addition, what form of inclination the load factor thereof has, too, can be obtained. By providing, by the use of these pieces of information, control so that the speed of engine rotation is increased in feed-forward manner before the load of the electricity-generator engine (21) varies, it is possible to follow Path B in FIG. 6 to reach the final point. As a result, it becomes possible to improve the rate of fuel consumption by the amount saved by not following a path of poor rate of fuel consumption.

Figure 8:
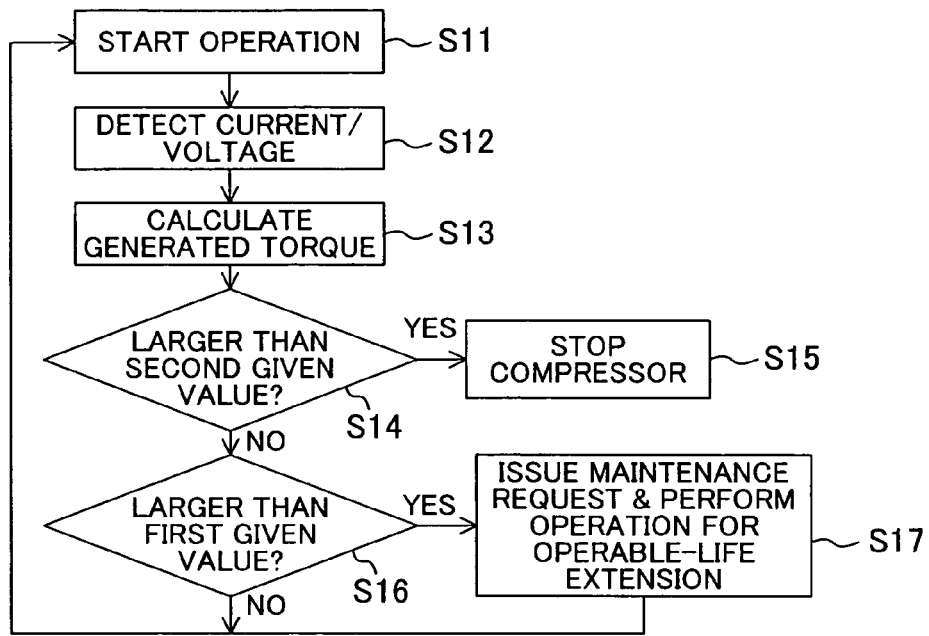
FIG. 8 is a flow chart for detecting, based on the operation torque, whether or not a malfunction is occurring in the compressor.

Next, referring to FIG. 8, the process flow of how the compressor malfunction detection part (44) determines, based on the generated torque (T), whether or not a malfunction is occurring in the electric compressor (31) will be described below.

When the refrigeration system (10) starts operating (step S11), the process flow moves to step S12 and the output electric current and the output voltage of the first inverter (24) are fed to the compressor malfunction detection part (44). In step S13, based on the output electric current and the output voltage, the compressor malfunction detection part (44) calculates the generated torque (T) from the following expression (1). Then, the process flow moves to step S14.

$$T = P \times \{\Psi 0 + (Ld - Lq) \times id\} \times iq \qquad \text{Expression (1)},$$

where "P", "$\Psi 0$", "Ld", and "Lq" are motor constant numbers which are design value or measured values at the time of production, and "id" and "iq" are as a result of dq conversion of the output electric current and "id" and "iq" indicate the d-axis electric current and the q-axis electric current, respectively.

In step S14, whether or not the generated torque (T) exceeds a second predetermined value is determined. If the determination in step S14 is affirmative, this indicates that the electric compressor (31) is malfunctioning. Then, the process flow moves to step S15 and the electricity-generator engine (21) and the electric compressor (31) are stopped. On the other hand, if the determination in step S14 is negative (i.e., $\leq$second predetermined value), this indicates that the electric compressor (31) is not malfunctioning. Then, the process flow moves to step S16. In step S16, whether or not the generated torque (T) exceeds a first predetermined value. If the determination in step S16 is affirmative, this indicates that the electric compressor (31) is about to malfunction. Then, the process flow moves to step S17 and the compressor operable-life extension operation is carried out and, in addition, a maintenance request message is displayed on the control panel screen or the like. On the other hand, if the determination in step S16 is negative (i.e., $\leq$first predetermined value), this indicates that the electric compressor (31) is completely normal and the process flow returns back to step S11. Also note that the first predetermined value is set such that it is larger than the normal value at the time of normal operation but smaller than the second predetermined value. In addition, these predetermined values are those that were previously determined from the relationship with the temperature inside and outside the storage compartment.

Figure 9:
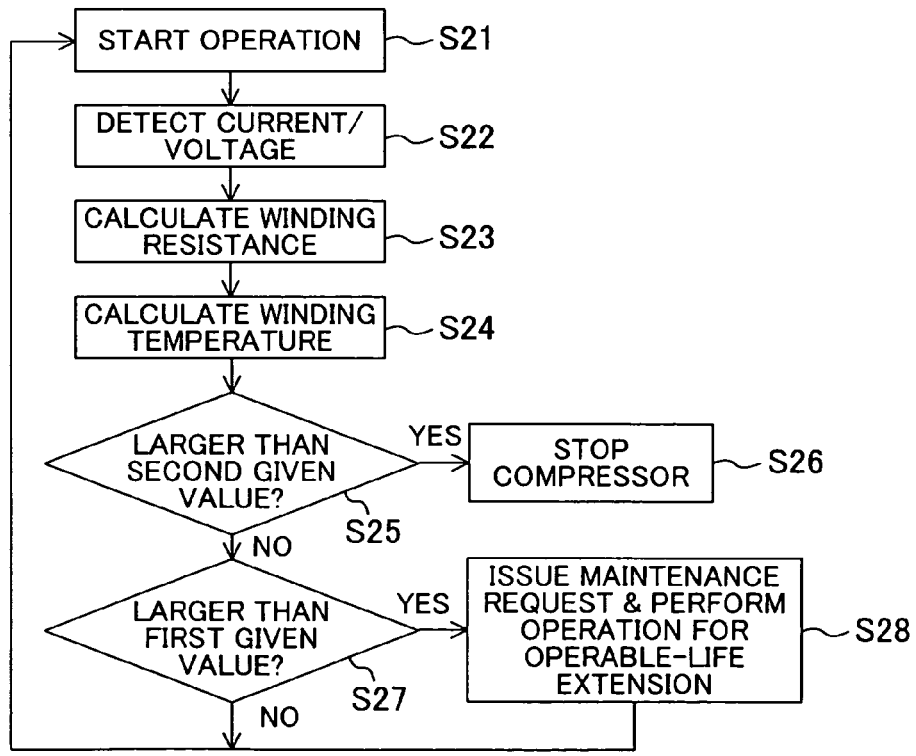
FIG. 9 is a flow chart for detecting, based on the winding resistance, whether or not a malfunction is occurring in the compressor.

Next, referring to FIG. 9, the process flow of how the compressor malfunction detection part (44) determines, based on the winding resistance (R), whether or not a malfunction is occurring in the electric compressor (31) will be described below.

When the refrigeration system (10) starts operating (step S21), the process flow moves to step S22 and the output electric current and the output voltage of the first inverter (24) are fed to the compressor malfunction detection part (44). In step S23, the compressor malfunction detection part (44) calculates, based on the output electric current and the output voltage, the motor winding resistance (R) (R=output voltage/output electric current) of the electric compressor (31) and the process flow moves to step S24. In step S24, the compressor malfunction detection part (44) calculates, from the winding resistance (R) and from the following expression (2), a winding temperature (t) and the process flow moves to step S25.

$$t = \{(R - R0)/(\alpha R0)\} + t0 \qquad \text{Expression (2)},$$

where "R0" indicates the winding resistance at the time when the winding temperature is "t0" and "$\alpha$" is a constant number.

In step S25, whether or not the winding temperature (t) exceeds a second predetermined value is determined. If the determination in step S25 is affirmative, this indicates that the electric compressor (31) is malfunctioning. Then, the process flow moves to step S26 and the electricity-generator engine (21) and the electric compressor (31) are stopped. On the other hand, if the determination in step S25 is negative (i.e., $\leq$second predetermined value), this indicates that the electric compressor (31) is not malfunctioning. Then, the process flow moves to step S27. In step S27, whether or not the winding temperature (t) exceeds a first predetermined value is determined. If the determination in step S27 is affirmative, this indicates that the electric compressor (31) is about to malfunction. Then, the process flow moves to step S28 and the compressor operable-life extension operation is carried out and, in addition, a maintenance request message is displayed on the control panel screen or the like. On the other hand, if the determination in step S27 is negative (i.e., ≦first predetermined value), this indicates that the electric compressor (31) is completely normal and the process flow returns back to step S21. Also note that the first predetermined value is set such that it is larger than the normal value at the time of normal operation but smaller than the second predetermined value. In addition, these predetermined values are those that were previously determined from the relationship with the discharge pipe temperature of the electric compressor (31).

Figure 10:
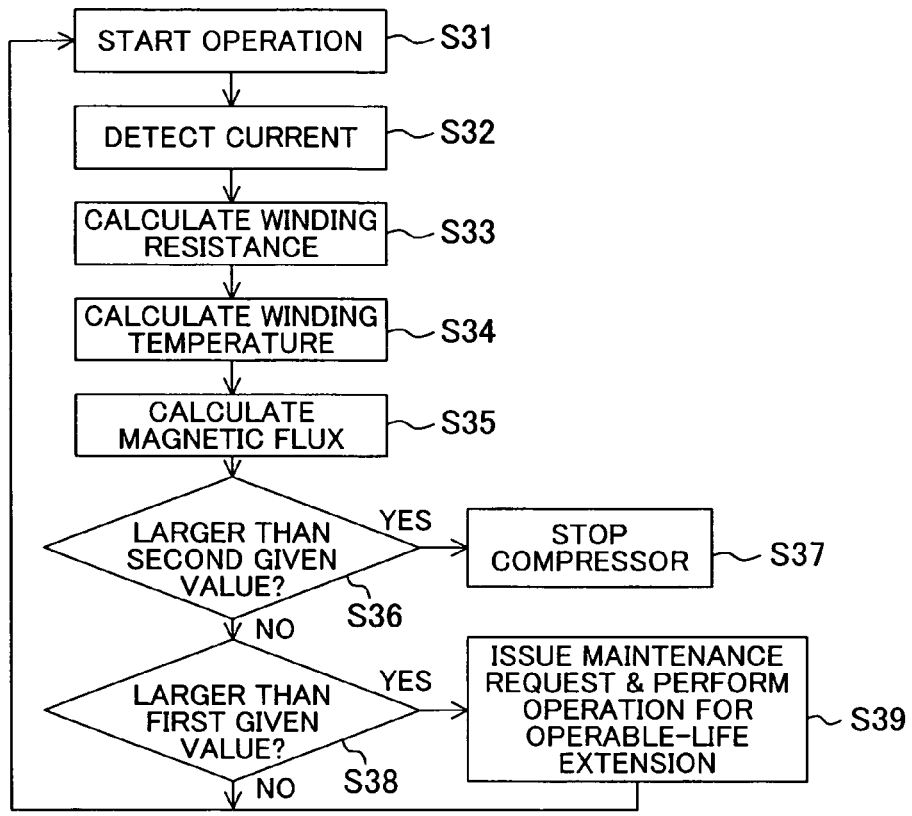
FIG. 10 is a flow chart for detecting, based on the magnetic flux, whether or not a malfunction is occurring in the compressor.

Next, referring to FIG. 10, the process flow of how the compressor malfunction detection part (44) determines, based on the magnetic flux (Ψ), whether or not a malfunction is occurring in the electric compressor (31) will be described below.

When the refrigeration system (10) starts operating (step S31), the process flow moves to step S32. The contents of control from step S32 to step S34 are the same as the contents of control from step S22 to step S24 (FIG. 9). That is, the compressor malfunction detection part (44) calculates, based on the output electric current and the output voltage of the first inverter (24), the winding resistance (R) of the electric compressor's (31) motor and then calculates, based on the calculated winding resistance (R), the winding temperature (t). After the calculation of the winding temperature (t), the process flow moves to step S35 and the compressor malfunction detection part (44) calculates, from the calculated winding temperature (t) and from the following expression (3), the magnetic flux (Ψ) of the motor magnet of the electric compressor (31). Then, the process flow moves to step S36.

$$\Psi = \Psi 0 + A \times t \qquad \text{Expression (3),}$$

where "Ψ0" indicates the magnetic flux value at the time of design, "A" indicates the temperature coefficient derived from the magnetic characteristics, and "t" indicates the winding temperature.

In step S36, whether or not the magnetic flux (Ψ) falls lower than a second predetermined value is determined. If the determination in step S36 is affirmative, this indicates that the electric compressor (31) is malfunctioning. Then, the process flow moves to step S37 and the electricity-generator engine (21) and the electric compressor (31) are stopped. On the other hand, if the determination in step S36 is negative (i.e., ≧second predetermined value), this indicates that the electric compressor (31) is not malfunctioning. Then, the process flow moves to step S38. In step S38, whether or not the magnetic flux (Ψ) falls lower than a first predetermined value. If the determination in step S38 is affirmative, this indicates that the electric compressor (31) is about to malfunction. Then, the process flow moves to step S39 and the compressor operable-life extension operation is carried out and, in addition, a maintenance request message is displayed on the control panel screen or the like. On the other hand, if the determination in step S38 is negative (i.e., ≧first predetermined value), this indicates that the electric compressor (31) is completely normal and the process flow returns back to step S31. Also note that the first predetermined value is set such that it is smaller than the normal value at the time of normal operation but larger than the second predetermined value. In addition, these predetermined values are those that were previously determined from the relationship with the discharge pipe temperature of the electric compressor (31).

Figure 11:
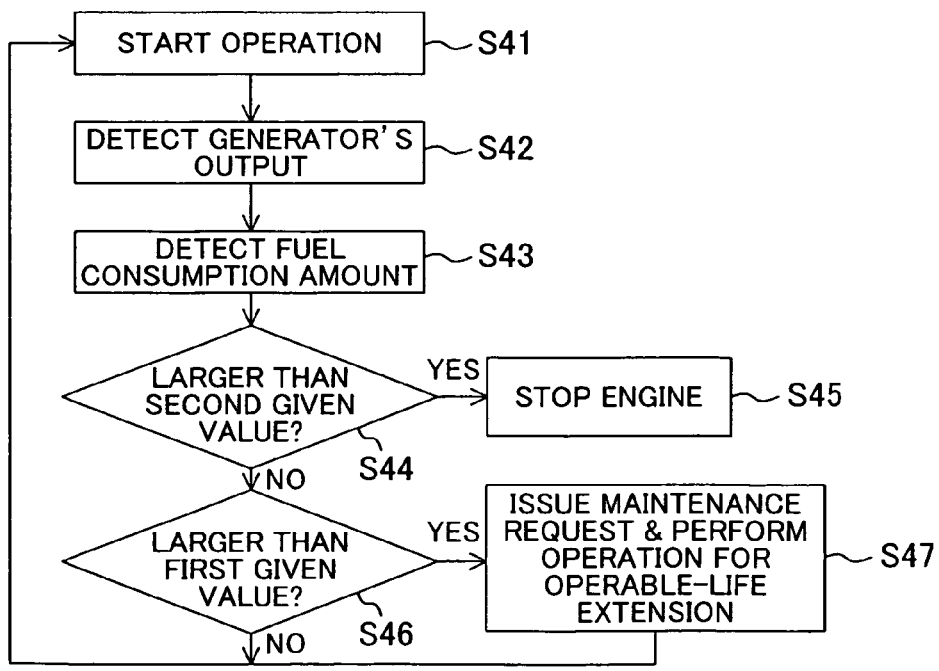
FIG. 11 is a flow chart for detecting, based on the amount of fuel supply, whether or not a malfunction is occurring in the electricity-generator engine.

Next, with reference to FIG. 11, the process flow of how the engine malfunction detection part (45) determines, based on the amount of fuel consumption (the amount of fuel supply), whether or not a malfunction is occurring in the electricity-generator engine (21) will be described below.

When the refrigeration system (10) starts operating (step S41), the process flow moves to step S42 and the output voltage of the electricity generator (22) is fed to the engine malfunction detection part (45). Alternatively, the input electric current and the input voltage of the converter (23) may be fed to the engine malfunction detection part (45). In step S43, the electronic governor of the rotation speed control part (43) provides the amount of fuel consumption to the engine malfunction detection part (45).

In step S44, whether or not the amount of fuel consumption exceeds a second predetermined value is determined. If the determination in step S44 is affirmative, this indicates that the electricity-generator engine (21) is malfunctioning. Then, the process flow moves to step S45 and the electricity-generator engine (21) and the electric compressor (31) are stopped. On the other hand, if the determination in step S44 is negative (i.e., ≦second predetermined value), this indicates that the electricity-generator engine (21) is not malfunctioning. Then, the process flow moves to step S46. In step S46, whether or not the amount of fuel consumption exceeds a first predetermined value is determined. If the determination in step S46 is affirmative, this indicates that the electricity-generator engine (21) is about to malfunction. Then, the process flow moves to step S47, and the engine operable-life extension operation is carried out and, in addition, a maintenance request message is displayed on the control panel screen or the like. On the other hand, if the determination in step S46 is negative (i.e., ≦first predetermined value), this indicates that the electricity-generator engine (21) is completely normal and the process flow returns back to step S41. Also note that the first predetermined value is set such that it is larger than the normal value at the time of normal operation but smaller than the second predetermined value. In addition, these predetermined values are those that were previously determined from the relationship with the output voltage of the electricity generator (22) fed to the engine malfunction detection part (45) in step S42.

In addition, the fan malfunction detection part (46) determines, by employing the same detection method as the compressor malfunction detection part (44), whether or not a malfunction is occurring in the fan (35, 36). For example, whether or not the generated torque (T) of the fan's (35, 36) motor exceeds a second predetermined value is determined. If the determination is affirmative, this indicates that the fan (35, 36) is malfunctioning, and the electricity-generator engine (21) and the fan (35, 36) are stopped. If the determination is negative (i.e., ≦second predetermined value), this indicates that the fan (35, 36) is not malfunctioning. This is followed by determining whether or not the generated torque (T) exceeds a first predetermined value. If the determination is affirmative (i.e., ≧first predetermined value), this indicates that the fan (35, 36) is about to malfunction, and the fan operable-life extension operation is carried out and, in addition, a maintenance request message is displayed on the control panel screen or the like. If the determination is negative (i.e., ≦first predetermined value), this indicates that the fan (35, 36) is completely normal, and the process flow is terminated.

Next, description will be made in terms of control modes other than the aforesaid normal control modes.

Upon the selection of a low-noise control mode, the engine control part (42) provides control so that the electricity-generator engine (21) is driven at a lower speed of rotation than the predetermined speed of rotation lower than the allowable maximum speed of rotation even if that lower speed of rotation is a point at which the fuel consumption is poor. As a result, the electricity-generator engine (21) is driven in the low noise mode, overriding the energy saving mode.

Upon the selection of a high-accuracy control mode, the refrigeration equipment control part (41) fixes the speed of rotation of the electric compressor (31) when the temperature of the storage compartment reaches a target temperature, and controls only the speed of rotation of the fan (35, 36) in response to the variation in thermal load. This therefore makes it possible to provide temperature control of faster response and higher accuracy when compared to the case where temperature control is provided only through the electric compressor (31). That is, after the temperature of the storage compartment reaches a target temperature, what is required is just to cope with the thermal load due to the transfer of heat through, for example, the outer wall of the refrigeration storage compartment (C). Even if the speed of rotation of the electric compressor (31) is controlled, a so-called "hatching phenomenon" occurs when trying to abruptly vary the speed of rotation because the responsiveness to the variation in capacity is lowered by the amount corresponding to the thermal time constant of each part. On the other hand, for the case of the controlling of the fan (35, 36), since there exist no special thermal time constants, the appearance as a capacity variation is rather expedited by the amount corresponding to the regulated speed of rotation.

Upon the selection of a fan intermittent control mode, the refrigeration equipment control part (41) provides control so that the fan (35, 36) is driven alternately at low speed of rotation and at high speed of rotation. More specifically, the fan (35, 36) is driven alternately at low air supply capacity and high air supply capacity capable of sending air to the deep side of the trailer. This makes it possible to generate a turbulent flow in the refrigeration storage compartment (C). As a result, the temperature distribution of the storage compartment is made uniform.

ADVANTAGEOUS EFFECTS OF THE EMBODIMENT

As described above, it is arranged in the present embodiment such that the electricity-generator engine (21), the electric compressor (31), and the fan (35, 36) can each be controlled independently from the others. Therefore, there is no need that the electricity-generator engine (21) be driven in conjunction with the speed of rotation of the electric compressor (31) and the fan (35, 36). Accordingly, since there is no need to drive the electricity-generator engine (21), for example, at low speed of rotation/high torque, this eliminates the need that the displacement of the electricity-generator engine (21) be increased more than is necessary. As a result, it becomes possible to reduce the electricity-generator engine (21) in both size and weight.

In addition, it is possible to drive the electricity-generator engine (21) at a speed of rotation that provides optimal efficiency for the electricity-generator engine (21), regardless of the electric compressor (31) et cetera. As a result, the energy saving of the system is achieved.

Additionally, the converter (23) can be selectively connected to either the electricity generator (22) or a commercial power supply source. As a result, for example, when the refrigeration vehicle remains parked for many hours, there is no need to drive the electricity-generator engine (21). Consequently, the energy saving of the electricity-generator engine (21) is achieved.

In addition, it is possible to detect whether or not the electric compressor (31) is about to malfunction and to detect whether or not the electricity-generator engine (21) is about to malfunction. If detected, the load of, for example, the electric compressor (31) is reduced, thereby making it possible to extend its operable life as long as possible until the time of replacement.

OTHER EMBODIMENTS

For example, the electric compressor (31) is implemented by a compressor of the scroll type. However, the electric compressor (31) may be of the rotary type or of the so-called reciprocating type.

It should be noted that the above-described embodiments are essentially preferable exemplifications which are not intended in any sense to limit the scope of the present invention, its application, or its application range.

INDUSTRIAL APPLICABILITY

As has been described above, the present invention is useful as a refrigeration system for use in a trailer (cargo carrying platform vehicle).

What is claimed is:

1. A refrigeration system for use in a trailer, the trailer refrigeration system comprising:
   an electricity generator;
   an electricity-generator engine for driving the electricity generator;
   a converter for converting ac electric power generated by the electricity generator into dc electric power;
   a plurality of inverters, each inverter converting dc electric power from the converter into ac electric power;
   a refrigerant circuit having an electric compressor and a plurality of fans comprising a condenser fan and an evaporator fan, the electric compressor (31), the condenser fan (35), and the evaporator fan (36) being driven respectively by ac electric power from the plurality of inverters; and
   control means for individually controlling the speed of rotation of the electricity-generator engine, the electric compressor, the condenser fan, and the evaporator fan, the control means including:
      a refrigeration equipment control part for controlling, based on the storage compartment temperature of the trailer, the output of each inverter to thereby control the speed of rotation of the electric compressor, the condenser fan, and the evaporator fan; and
      an engine control part for controlling, based on either the input/output state of each inverter or the input/output state of the converter, the speed of rotation of the electricity-generator engine.

2. The trailer refrigeration system of claim 1, wherein when the electric compressor is driven at the maximum speed of rotation thereof, the control means controls the electricity-generator engine so that the speed of rotation of the electricity-generator engine falls lower than the maximum speed of rotation of the electric compressor.

3. The trailer refrigeration system of claim 1, wherein when the electric compressor is driven at the minimum speed of rotation thereof, the control means controls the electricity-generator engine so that the speed of rotation of the electricity-generator engine exceeds the minimum speed of rotation of the electric compressor.

4. The trailer refrigeration system of claim 1, wherein the engine control part is configured such that it controls the speed of rotation of the electricity-generator engine by regulating the amount of fuel supply to the electricity-generator engine.

5. The trailer refrigeration system of claim 4,
wherein the electricity-generator engine has an electronic governor; and
wherein the engine control part is configured such that it regulates the amount of fuel supply to the electricity-generator engine by controlling the electric governor.

6. The trailer refrigeration system of claim 1, wherein the electric compressor is configured such that it has a compression mechanism of the rotary type.

7. The trailer refrigeration system of claim 1, wherein the trailer refrigeration system is provided with a selector switch for providing selective switching between a first state that establishes connection of the converter to the electricity generator and a second state that establishes connection of the converter to a commercial power-supply source.

8. The trailer refrigeration system of claim 1,
wherein the control means is provided with a compressor malfunction detection part for detecting whether or not a malfunction is occurring in the electric compressor; and
wherein if the compressor malfunction detection part detects such a compressor malfunction, the refrigeration equipment control part controls the inverter so that the speed of rotation of the electric compressor is fixed at a predetermined value.

9. The trailer refrigeration system of claim 8, wherein the compressor malfunction detection part is configured such that it detects, based on the generated torque, T, of a motor of the electric compressor, whether or not a malfunction is occurring in the electric compressor.

10. The trailer refrigeration system of claim 8, wherein the compressor malfunction detection part is configured such that it detects, based on the winding resistance, R, of a motor of the electric compressor, whether or not a malfunction is occurring in the electric compressor.

11. The trailer refrigeration system of claim 8, wherein the compressor malfunction detection part is configured such that it detects, based on the magnetic flux, $\psi$, of a motor magnet of the electric compressor, whether or not a malfunction is occurring in the electric compressor.

12. The trailer refrigeration system of claim 1,
wherein the control means is provided with an engine malfunction detection part for detecting, based on the amount of fuel supply to the electricity-generator engine, whether or not a malfunction is occurring in the electricity-generator engine; and
wherein the refrigeration equipment control part is configured such that if the engine malfunction detection part detects such an engine malfunction, it controls the speed of rotation of the electric compressor and at least one of the condenser fan or the evaporator fan so that the load of the electricity-generator engine is reduced.

13. The trailer refrigeration system of claim 1,
wherein the control means is provided with a fan malfunction detection part for detecting whether or not a malfunction is occurring in the condenser fan or the evaporator fan; and
wherein the refrigeration equipment control part is configured such that if the fan malfunction detection part detects such a fan malfunction, it controls the inverter so that the speed of rotation of the malfunctioning fan is fixed at a predetermined value.

* * * * *